(12) United States Patent
Delcher et al.

(10) Patent No.: US 7,263,245 B2
(45) Date of Patent: Aug. 28, 2007

(54) METHOD AND APPARATUS FOR OPTICALLY POWERING AND MULTIPLEXING DISTRIBUTED FIBER OPTIC SENSORS

(75) Inventors: Ray C. Delcher, Oxnard, CA (US); Mohsen Khoshnevisan, Newbury Park, CA (US); William R. Christian, Newbury Park, CA (US)

(73) Assignee: The Boeing Company, Chicago, IL (US)

( * ) Notice: Subject to any disclaimer, the term of this patent is extended or adjusted under 35 U.S.C. 154(b) by 168 days.

(21) Appl. No.: 11/079,688

(22) Filed: Mar. 14, 2005

(65) Prior Publication Data

US 2006/0202109 A1    Sep. 14, 2006

(51) Int. Cl.
*G02B 6/00* (2006.01)
*G01J 1/44* (2006.01)
*H04J 14/08* (2006.01)

(52) U.S. Cl. .................. 385/12; 385/15; 385/24; 385/88; 385/92; 250/227.11; 250/227.14; 250/214 R; 398/98; 398/99; 398/100

(58) Field of Classification Search ............ 385/12, 385/88, 89, 92, 93, 94, 15, 16, 24; 250/227.11, 250/227.14, 227.28, 227.24, 214 R; 398/98, 398/99, 100, 101
See application file for complete search history.

(56) References Cited

U.S. PATENT DOCUMENTS

| | | | | |
|---|---|---|---|---|
| 4,546,249 A | | 10/1985 | Whitehouse | 250/227.11 X |
| 4,628,493 A | * | 12/1986 | Nelson et al. | 367/79 |
| 4,820,916 A | * | 4/1989 | Patriquin | 250/208.2 |
| 4,857,727 A | * | 8/1989 | Lenz et al. | 398/168 |
| 4,900,947 A | | 2/1990 | Weiner | 307/110 |
| 5,008,662 A | * | 4/1991 | Tokizane et al. | 370/245 |

(Continued)

FOREIGN PATENT DOCUMENTS

WO    WO 00/52835 A    9/2000    ............... 385/17 X (Continued)

OTHER PUBLICATIONS

Al-Mohanadi, et al., "Optical power and intelligent sensors," Department of Electronics and Computer Science, pp. 142-146 (1997).

(Continued)

*Primary Examiner*—Brian M. Healy
(74) *Attorney, Agent, or Firm*—Wildman, Harrold, Allen & Dixon, LLP

(57) ABSTRACT

An optical power converting apparatus is provided that may be used with remote sensors. A plurality of remote sensors may be coupled to a backbone optical fiber with each sensor having an optical power converter that receives an optical signal from a head end of that fiber. The optical power converters may store electrical energy derived from that optical signal and use that energy to power the remote sensors. The head end's optical signal may also include a clock signal, and each remote sensor may be set to sense a measurable parameter after a given number of clock cycles have been counted. In a further example, each of the optical sensors may be synchronized before counting these clock signals via a synchronization signal from the optical power converter. The remote sensors may individually and separately uplink their sensed data to the head end on the optical fiber. The apparatus may be implemented in a vehicle health management system, for example.

28 Claims, 10 Drawing Sheets

U.S. PATENT DOCUMENTS

| | | | | |
|---|---|---|---|---|
| 5,223,707 | A | * | 6/1993 | Bjork .................... 250/227.21 |
| 5,239,181 | A | | 8/1993 | Sun et al. ................... 250/551 |
| 5,822,200 | A | | 10/1998 | Stasz ........................... 363/21 |
| 6,691,007 | B2 | | 2/2004 | Haugse et al. ................ 701/29 |
| 2006/0202109 | A1 | * | 9/2006 | Delcher et al. ......... 250/214 R |

OTHER PUBLICATIONS

Beck, et al., "Tapping Optical Fiber," Laser Focus, (5 pages) (1987).

"6 Volt Photovoltaic Power Converter, PPC-6ME," Photonic Power Systems, Inc. (2 pages) (2002) [online].

"6 Volt Photovoltaic Power Converter, PPC-6ME," Photonic Power Systems, Inc. (2 pages) (2003) [online].

"16-Bit Optically Powered Data Link System, OPDL-16" Photonic Power Systems, Inc. (2 pages) [online] (Printed Mar. 2005).

"Power over Fiber—Isolated Power Delivery System, PoF" Photonic Power Systems, Inc. (2 pages) [online] (Printed Mar. 2005).

"6 Volt Photovoltaic Power Converter, PPC-6E," Photonic Power Systems, Inc. (2 pages) (2001) [online].

"6 Volt Photovoltaic Power Converter, PPC-6E," Photonic Power Systems, Inc. (2 pages) (2003) [online].

"Fiber Optic Temperature Sensor, OPTS," Photonic Power Systems, Inc. (2 pages) [online] (Printed Mar. 2005).

Imen, et al., "Laser-fabricated fiber-optic taps," Optics Letters, 15(17):950-952 (1990).

Maier, et al., "Fiber Bragg Grating Location by a Side-Scatter Technique Based on Cladding-Mode Coupling" Applied Optics, 43(16):3310-3314 (2004).

Prucnal, et al., "Low-loss, High-impedance Integrated Fiber-Optic Tap," Optical Engineering, 29(9):1136-1142 (1990).

Weiss, et al., "Optically Powered Sensor Technology," ISA 97 paper (6 pages, 1997).

Zhou, et al., "Fibre bragg grating sensor interrogation system using a CCD side detection method with superimposed blazed gratings" (Jun. 2004).

* cited by examiner

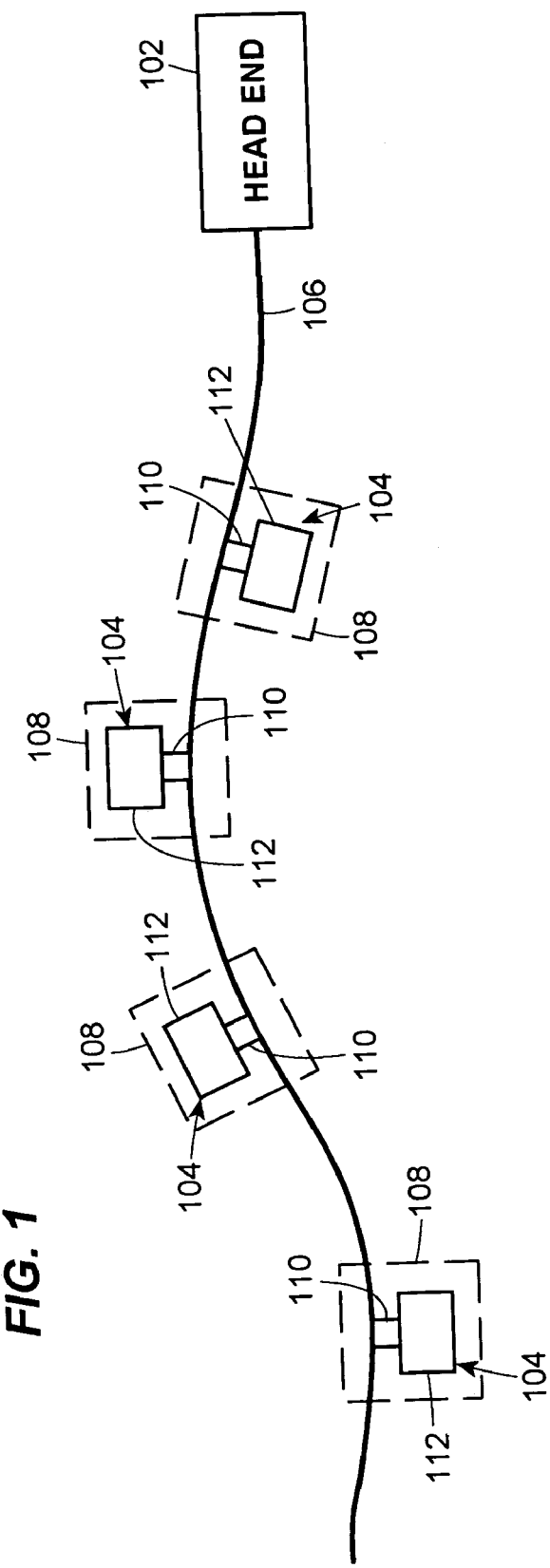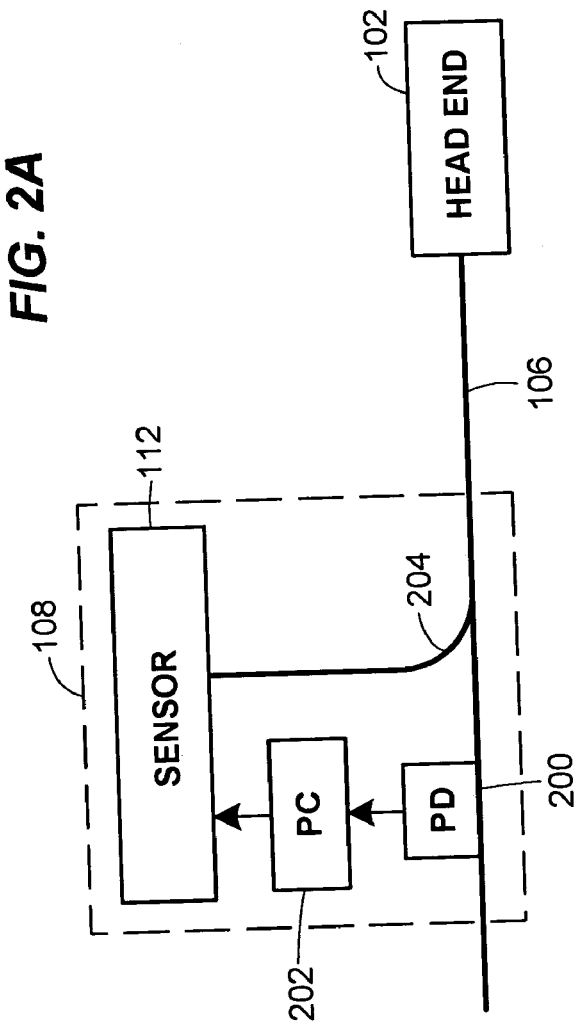

METHOD AND APPARATUS FOR OPTICALLY POWERING AND MULTIPLEXING DISTRIBUTED FIBER OPTIC SENSORS

FIELD OF THE INVENTION

The present invention relates generally to sensors and more particularly to optically-powered sensors.

BACKGROUND OF THE RELATED ART

For years, people have used remote sensors in hostile environments, placing sensors in locations where human or manual data collection is unattainable or too costly. In toxic and environmentally dangerous environments, for example, remote sensors may provide an effective way of measuring data that might otherwise go unmeasured. In space-constrained environments, remote sensors may be useful in reaching otherwise unreachable locations.

Despite the deployment of remote sensors in certain applications, many applications are incompatible with certain types of remote sensors, or remote sensors altogether. Electrically-powered remote sensors, for example, are not used in environments where electrical conduction can lead to sensor damage or environmental damage. In an aircraft, for example, lightning strikes can be dangerous and damage on-board electronics such as those that would be used in and to power electronic sensors. This lightning problem may be exacerbated by the light-weight, less shielding composite structures used with increasing regularity in modern aircraft. In a spacecraft, for example, a lightning strike could harm the electronic sensors used to monitor mission critical launch conditions. In fact, lightning damage has resulted in some infamous losses of spacecraft, including the Atlas G-Centaur AC-67 space mission. Lightning also nearly caused the astronauts to abort the Apollo 12 spacecraft launch, when a lightning strike triggered electrical warning signals and disabled telemetry systems. Moreover, the problem of spiking is not limited to lightning, as other high voltages would be hazardous if combined with electrically powered sensors in certain environments, such as inside fuel tanks where there is the potential for an igniting hazard through short circuits in the electrical wiring.

Not only are electrical field and voltage surges problematic, high-power microwave radiation can also limit the use of certain types of sensors. For example, it is difficult to use electronic sensors to monitor high-power phased array radar systems because of electromagnetic field interference. High voltage isolation is a limiting factor for high-voltage, power-line sensor applications, as well.

Whereas electrically-powered sensors may be incompatible with certain environments, optically-powered sensors may show potential. In aircraft, for example, an optically powered sensor could protect against lightning, electric fields and discharges, and other electronic interference.

Yet, despite the theoretical attractiveness of optically-powered sensors, there are numerous limitations affecting their deployment. One problem is the lack of efficient and effective methods to optically power multiple sensors. Some powering techniques convert an optical energy on a fiber to electrical power at the sensor. However, the techniques are only used to power a single sensor, unless a fiber optic splitter or multiplexing device is used, thereby adding to device cost, weight, and complexity. Furthermore, remote powering techniques can require a minimum of two fibers for each sensor—one fiber to optically power the sensor, another fiber to receive sensor data. Even the commercially-available pie-wedge photonic power converters suggested by some (in addition to being expensive) would require a fiber bundle to receive data from multiple sensors. In short, the present techniques for optically powering remote sensors would require multiple fibers or a large fiber bundle if multiple sensors were to be deployed, and this requirement is undesirable in space- or weight-constrained systems such as an aircraft, or spacecraft.

It is desirable to have a way of optically powering multiple sensors that may be placed remotely from one another, and to do so in a way that remote sensed signals may be communicated to a centralized analyzer via the same fibers used for powering the sensors.

SUMMARY OF THE INVENTION

An embodiment of the invention is an optical power converter comprising: a photodetector for producing an electrical signal; a storage circuit in parallel with the photodetector to store at least a portion of the electrical signal; a first chargeable switch; a second chargeable switch having a different charging time than the first chargeable switch; and a dual transistor switch coupled to the first chargeable switch and the second chargeable switch, wherein the storage circuit is coupled to the dual transistor switch, and wherein during a storing state the photodetector supplies current to the storage circuit and the dual transistor switch is in an off state, and wherein during a driving state, the storage circuit supplies current to switch the dual transistor switch to an on state wherein at least one of the first chargeable switch or the second chargeable switch is in a conducting state.

Another embodiment of the invention is an optically-powered sensor apparatus comprising: an optical fiber; a head end coupled to the optical fiber to provide optical clock signals on the optical fiber; and at least two sensor modules coupled to the optical fiber and optically powered by the optical clock signals, each sensor module comprising an optical power converter for converting the optical clock signals to electrical clock signals, a timer for counting the electrical clock signals, and a sensor for sensing a measurable parameter, wherein the at least two sensor modules are adapted to sense the measurable parameter after a different number of electrical clock signals have been counted.

A further embodiment of the invention includes a method of time division multiplexing a plurality of sensor modules coupled to an optical fiber, the method comprising: transmitting an optical signal on the optical fiber, the optical signal having a clocking portion wherein optical clock signals are provided and a synchronizing portion; at each of the plurality of sensor modules, receiving the optical signal and converting the optical clock signals of the clocking portion to electrical clock signals; synchronizing each of the plurality of sensor modules; counting the electrical clock signals; and for at least two of the plurality of sensor modules, sensing a measurable parameter after a different number of electrical clock signals have been counted.

Another embodiment of the invention includes an optically-powered sensor apparatus comprising: an optical fiber; a laser source coupled to the optical fiber for providing optical clock signals on the optical fiber; a first sensor module coupled to the optical fiber and optically powered by the laser source, the first sensor module having a sleep mode during which the first sensor module is incapable of sensing a first measurable parameter and an awake mode during which the first sensor module is capable of sensing the first measurable parameter, wherein the first sensor module is adapted to switch from the sleep mode to the awake mode after a first number of optical clock signals have been received at the first sensor module; and a second sensor module coupled to the optical fiber and optically powered by the laser source, the second sensor module having a sleep mode during which the second sensor module is incapable of sensing the second measurable parameter and an awake mode during which the second sensor module is capable of sensing the second measurable parameter, wherein the second sensor module is adapted to switch from the sleep mode to the awake mode after a second number of optical clock signals have been received at the second sensor module, where the second number of optical clock signals is different than the first number of optical clock signals.

Another embodiment of the invention includes a method of diagnosing the state of a vehicle, the method comprising: coupling optical clock signals to the plurality of sensor modules via an optical fiber, each sensor module being disposed at a region of interest and each sensor module having a sleep mode and an awake mode; optically powering the plurality of sensor modules; at each sensor module, counting the number of optical clock signals received during the sleep mode; at each sensor module, in response to the counting of the number of optical clock signals received during the sleep mode, switching the sensor module from the sleep mode to the awake mode, where each sensor module is switched from the sleep mode to the awake mode after a different number of optical clock signals have been counted; at each sensor module, sensing a measurable parameter and producing sensed data; and diagnosing the sensed data from each sensor module.

Some of the embodiments of the invention provide devices and techniques that fiber optically power multiple sensors on an optical fiber. The principle of operation of the optically powered distributed sensors can vary, according to the parameters being sensed, and system designer preference. For example, such sensor nodes can be electronic, magnetic, optical, electro-optic, acoustic/ultrasonic, or combinations thereof. In some of these examples, these sensors may be time division multiplexed to communicate a sensed signal on the same optical fiber used to deliver power to the sensor. The devices and techniques may include synchronizing the multiple sensors and having the multiple sensors communicate their sensed signals on the optical fiber, without interfering with an optical powering signal on that fiber. Of course, the features, functions, and advantages can be achieved independently in various embodiments of the present invention or may be combined in yet other embodiments.

BRIEF DESCRIPTION OF THE DRAWINGS

FIG. 1 illustrates an example of an optical sensor system having a head end and a plurality of sensor modules coupled to an optical fiber extending from the head end.

FIG. 2A illustrates a detailed example of a sensor module that may be used in the system of FIG. 1.

DETAILED DESCRIPTION OF AN EXAMPLE

Figure 2B:
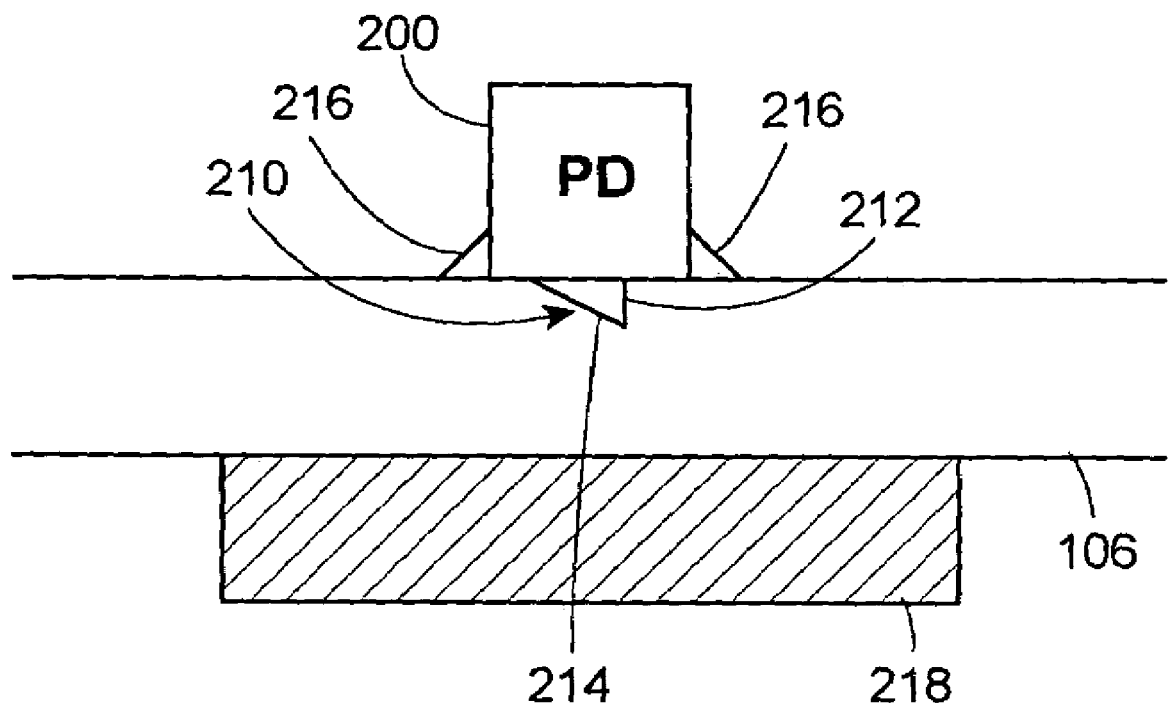
FIG. 2B illustrates an example of direct coupling of a photodetector to the side of an optical fiber, using a small slanted notched surface created at the side of the fiber, to improve light tapping efficiency.

Numerous exemplary devices and techniques are described below, and some are described in relation to rather detailed examples. However, the devices and techniques are not limited to such examples, but rather may be implemented in various applications. For example, although some examples are described as usable in an aircraft, including spacecraft, the devices and techniques may be used in other vehicles or systems. The devices and techniques may be used, more broadly, in any environment in which remote sensing via an optical fiber and a head end, receiver station, or transmitter station may be desired. The devices and techniques may be used in various sensor applications, such as hydrogen sensors applications, oxygen sensing applications, or strain sensor applications, e.g., in shell composite layers. Yet, other applications, e.g., measuring performance along a high-voltage electrical transmission line, will be known to persons of ordinary skill in the art upon reviewing the disclosure herein.

FIG. 1 illustrates an example of an optoelectronic sensor system 100 that may be used to monitor conditions in remote environments, both non-hostile and hostile. Example environments include portions of an aircraft (e.g., an airplane or spacecraft) or other airborne vehicles (e.g., un-manned booster rockets). Further examples include environments where there is potential for exposure to harsh or hazardous conditions, such as oil wells.

To provide remote sensing within a system, such as an aircraft, the system 100 has a head end 102, or base station, that communicates with a plurality of sensor modules 104, via an optical fiber backbone 106. The head end 102, for example, may have a laser source and may send an optical signal on the fiber 106 to the sensor modules 104. As described in further detail below, that optical signal may provide timing information to the sensor modules 104 and may also optically power them. Based on the timing information, the sensor modules 104 may provide sensed data back to the head end 102.

Although the modules 104 may be placed in traditionally difficult-to-reach locations, the head end 102 typically is stored in a non-hostile location accessible to personnel or analysis equipment. However, this need not be the case.

In the illustrated example, the backbone fiber 106 extends along a series of monitoring regions 108 each representing an area monitored by the modules 104, such as different areas within an aircraft. The sizes of the regions 108 may depend on the type of sensors deployed, and thus, are only generally shown. The apparatuses and methods described herein are not limited to a particular type of sensor.

The backbone fiber 106 may be formed of any number of suitable optical fibers. However, as certain remote environments may benefit from more rugged fibers, a hard clad silica (HCS) trunk fiber, such as a 200 µm core, multimode fiber may be used. By way of example, not limitation, a fiber rated at 40 pounds or higher tensile strength may be used. An example HCS fiber is available from OFS Specialty Photonics of Avon, Conn. Further, the fiber 106 may be coated with a plastic coating that prevents moisture from producing embrittlement within the fiber core, which would reduce fiber strength. However, despite these examples, the present disclosure is not limited to a particular fiber, size, composition, or fabrication technique.

Each sensor module 104 may be coupled to the fiber 106 via a coupler 110, and each sensor module 104 may have at least one sensor 112 coupled to that coupler 110. The coupler 110 may represent two couplings, one a coupling of the module 104 to the fiber 106 for receiving optical power, the other a coupling of the sensor module 104 to the fiber 106 for transmitting a sensed signal on the fiber 106. The couplings may be achieved through a variety of techniques, such as hard clad silica tapping techniques. For example, to receive optical power, a photodiode may be directly adhered to the fiber 106 to absorb the optical power from the fiber 106. In this case, the efficiency of coupling the optical power to the photodiode may be enhanced by removing part of the fiber cladding. Removing the cladding at an angle, to create a slanted surface can reflect light more efficiently onto the photodiode attached to the side of the fiber. For improved efficiency, the surface of the slant can be metallized, for example, by metal evaporation. An example coupling technique is shown in FIG. 2B discussed below. To transmit a sensed signal, a tap optical fiber (e.g., optical fiber tap 204, in FIG. 2A) may be coupled to the fiber 106. If the sensor 112 includes a vertical cavity surface emitting laser (VCSEL), for example, the tap fiber at the sensor 112 may be positioned at the focal point of a lens that collects the output from that VCSEL. A VCSEL produces an emission cone that is typically quite small, and, thus, a small tap may be used, one that is not susceptible to detrimental power leakage into the VCSEL from the optical power on the fiber 106. In another example, the sensed signal may be coupled directly from the VCSEL into the fiber 106, without use of a tap fiber or waveguide, in a similar way as discussed for the photodetector. In another example, the coupler 110 may include a single tap fiber in combination with a splitter/combiner for coupling received and transmitted light.

The couplings of coupler 110 may be designed to occur at a radial bend of the fiber 106, where the bend will naturally facilitate light leakage into or out of the fiber. The cladding of the fiber 106 at the bend may be partially or fully removed by an etching or ablation technique to enhance coupling efficiently.

FIG. 2A illustrates a more detailed example of the sensing module 104 and, thus, shares like reference numerous with FIG. 1. A photodetector 200, or solar cell, is coupled directly to the fiber 106 to receive optical power signals. The photodetector 200 is also connected to a power converter 202, for optically powering the sensor 112, as explained in further detail below.

In the illustrated example, an optical fiber tap 204 is coupled directly to the sensor 112 to couple optical energy from the sensor 112 into the fiber 106, for example to upload a sensed output signal to the head end 102. Each of the sensor modules 104 of FIG. 1 may be identical to that detailed in FIG. 2A, or some or all of the modules 104 may be different.

FIG. 2B illustrates an example of direct coupling of a photodetector 200 to the side of the optical fiber 106, thus extracting some light leaking through the fiber cladding at the location of the contact, which may use an adhesive 216. Light extraction efficiency into the photodetector 200 can be significantly increased using, for example, a small notch 210 at the side of the fiber. The intersection of the angled surfaces 212 and 214, which constitute notch 210 need to be rounded and not at a sharp line, so the notch does not weaken the fiber 106 significantly. Fiber 106 may be glued down locally near the location of the notch to a small support plate 218, to additionally strengthen the fiber 106, near the location of the notch. Notch 210 may be created by, for example, gently running a file with triangular cross section against the side of the fiber. A small fraction of the light traveling in fiber 106 exits the approximately vertical surface 212, and reflects from the slanted surface 214 onto the photodetector 200. The surface 214 can be made more reflective by deposition of a thin metal film, for example, by angled deposition, such that the surface 212 is not metallized.

Figure 3A:
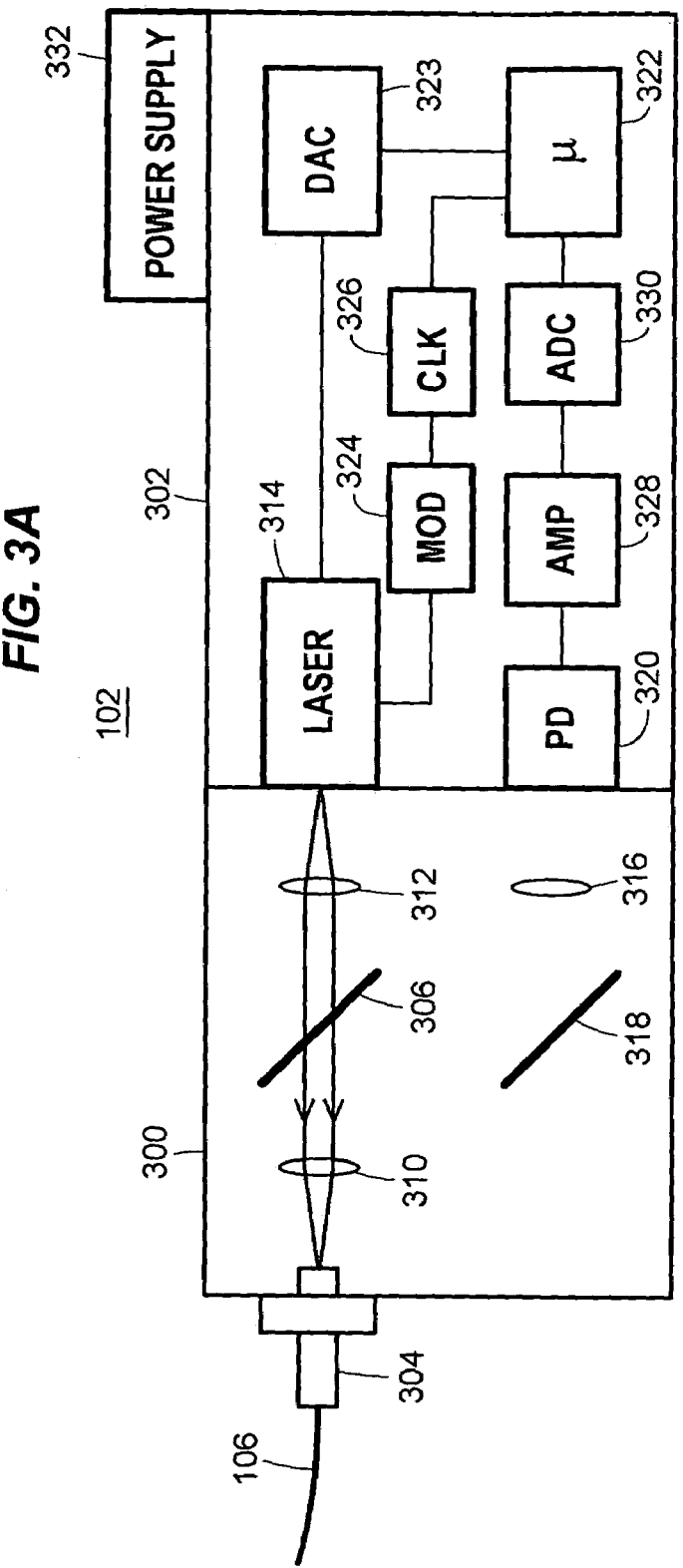
FIGS. 3A and 3B illustrate a detailed example of a head end that may be used in the system of FIG. 1.
Figure 3C:
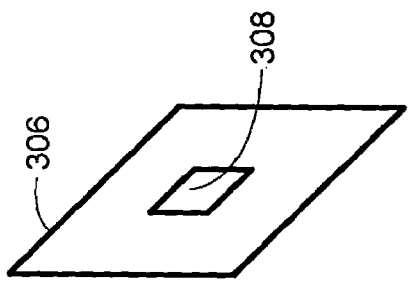
FIG. 3C illustrates an optical slit and mirror plate that may be used with the head end of FIGS. 3A and 3B to separate the outgoing laser power from the incoming data signals from the sensors.
Figure 3B:
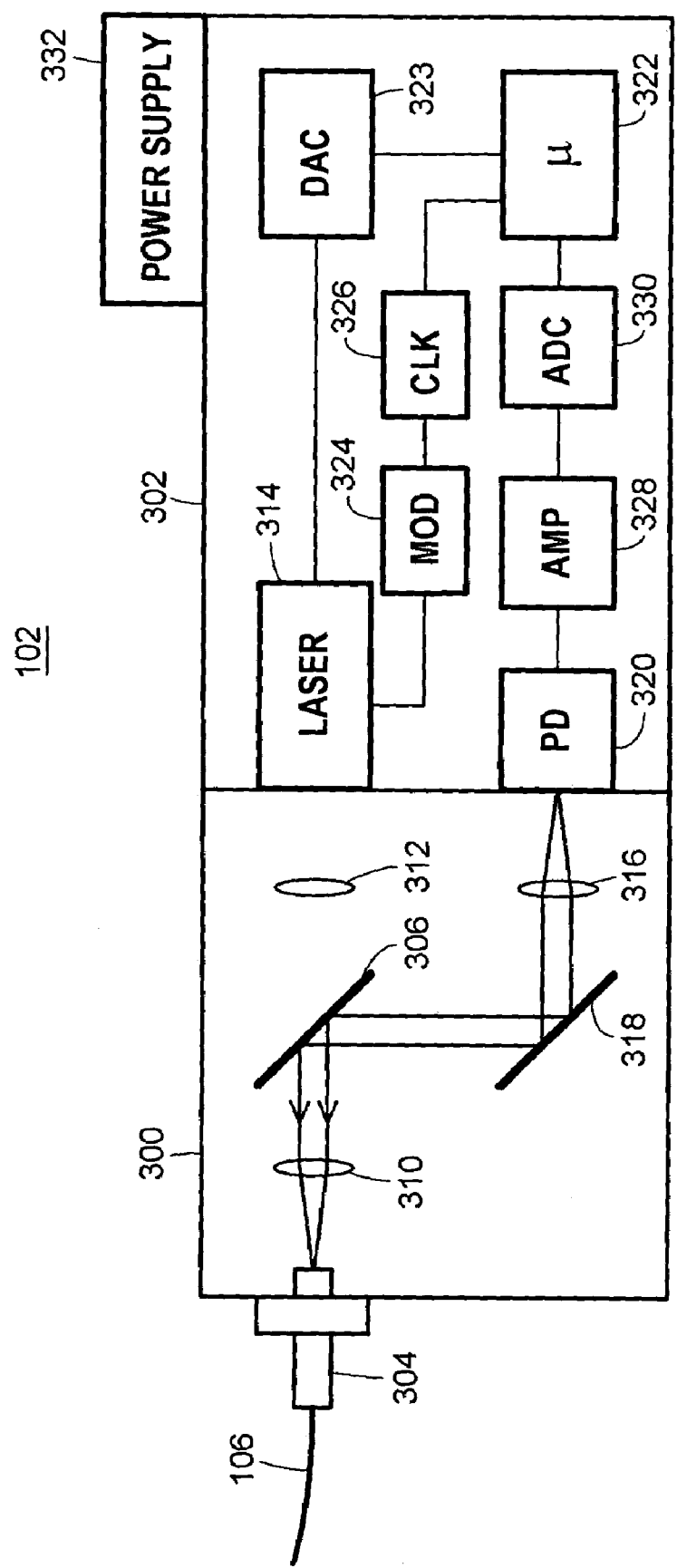

A detailed example of the head end 102 is shown in FIGS. 3A and 3B. The head end 102 may include two sections, a coupler 300 and a laser module 302, where the fiber 106 is connected to the coupler 300 via a pigtail connection 304, in the illustrated example.

The coupler 300 provides spatial filtering to transmit optical power signals from laser 314 part of the head end 102 into the fiber backbone 106 to the sensor modules 104, and to transmit sensed optical signals from the sensor modules 104 to a head end photodetector (e.g., photodetector 320) for receiving sensor data. The coupler 300 includes an optical plate 306 having a slit 308 (see, FIG. 3C). The plate 306 may be coated with reflective material, such as aluminum, silver, chrome or gold, or made of such reflective materials. An example plate 306 is the NT38-559 precision air slit available from Edmund Industrial Optics of Barrington, N.J. The plate 306 is positioned a distance from an input lens 310, positioned a focal distance from the pigtail 304. The optical plate 306 is also positioned a distance from a lens 312 coupled to a laser source 314 for producing the optical power signals. The laser source 314 may be one that emits output energy over a strip width, for example, over a 5 µm×50 µm output window. The slit 308 may be sized and positioned such that the output from the laser source 314 may be coupled directly through the slit 308 and into the fiber 106, through lenses 310 and 312, as shown.

The optical plate 306 is also positioned to communicate with a lens 316, which receives optical signals from the remote sensors via the fiber 106, after energy from the fiber 106 is reflected by the plate 306 onto an optional mirror 318. That is, for light coming out of the fiber 106, the end of the fiber 106 is imaged onto the slit 308. But if the fiber 106 is circular in cross-section at its end, and if the image of that core is large enough, then much of the light signal imaged on the plate 306, and centered on the slit 308 will fall outside the area of the slit 308, and reflect off the plate 306, and imaged by the lens 316 onto a photodetector 320.

In an alternative example to spatial filtering, a dichroic beam splitter or color filtering may be used in the coupler 300, whereby the spatial filter 306 is replaced by a filter that transmits the wavelength of laser 314 at the head end 102, but reflects the wavelengths of all of the VCSELs or other light sources such as light emitting diodes at sensor modules 104. Alternatively, a prism or other polarization-dependent reflector may be used to transmit the power laser 314 light and reflect light returning from the sensor modules 104.

The head end 102 also includes the module 302 that includes the power laser section and sensor data receiver section(s). The module 302 includes the laser source 314 and the photodetector 320, as well as a microcontroller 322 that controls operation of the laser source 314 through a digital-to-analog converter (DAC) 323. The laser source 314 may be any type of laser source, including an edge emitting laser, VCSEL, or diode laser. Alternatively, the laser source 314 may be a chemical or gas laser, or may represent an optical amplifier, such as a fiber amplifier or optical parametric amplifier.

In operation, the head end 102 may provide an optical signal having both a high state and a low state. Therefore, a modulator 324 is positioned to modulate the output from the laser 314. The optical signal, for example, may include an optical clock signal. That is, the laser module 302 may produce optical clock signals of any given repetition rate, for example, a 50% duty cycle optical clock signal having a 1 to 10 kilohertz repetition rate. In the illustrated example, the modulator 324 receives a clock control signal from a clock circuit 326 coupled to the microcontroller 322. Alternatively, the modulator 324 may be part of the laser 314.

Contrastingly, to receive optical energy from the fiber 106, the output of the photodetector 320 is provided to an amplifier 328, such as a transimpedance amplifier. The amplifier 328 is coupled to an analog-to-digital converter (ADC) 330 coupled to the microcontroller 322. Module 302 containing the laser and sensor data receiver sections may be powered by a power supply 332.

In an example operation of the system 100, the head end 102 produces an optical signal (e.g., one having clock signals over at least a portion) on the fiber 106 that propagates to each of the sensor modules 104. The power converters 202 at each module 104 may receive this optical signal at substantially the same time, to power the sensor modules 104. The clock signal portion of the optical signal may provide a timing signal through which these modules 104 may be instructed to turn on and begin sensing. For example, each distinct module 104 may be set to sense a measurable parameter after receipt of different numbers of these timing signals. The modules 104 may then use the fiber 106 to uplink a sensed output signal or other signal to the head end 102, e.g., after their respective number of timing signals has been received and during a time period the head end is not providing an optical signal thus avoiding interference. As such, the system 100 may provide a time division multiplexed set of remote sensors that are optically powered by a signal on the same fiber that is used to transmit (uplink) sensed signals from the remote sensors.

Figure 4:
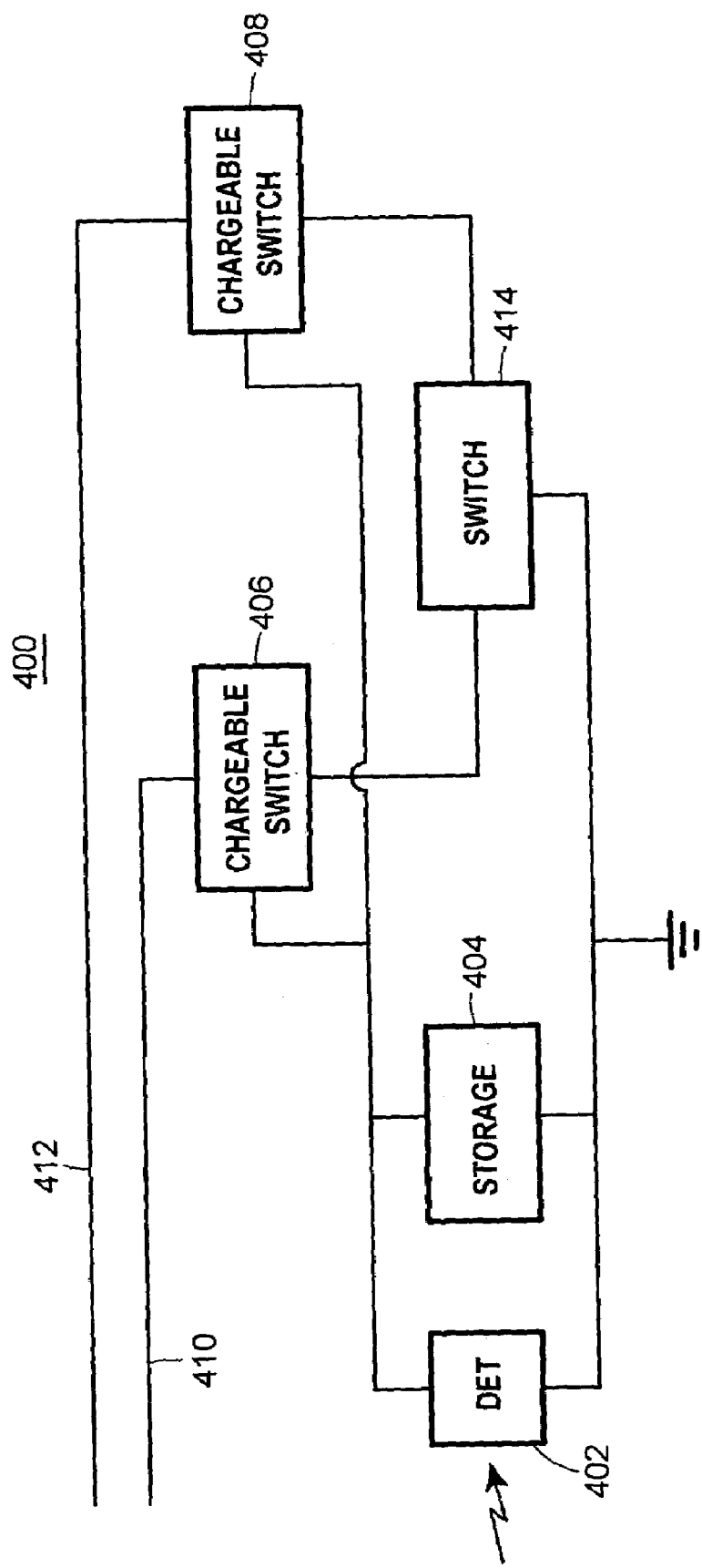
FIG. 4 illustrates an example of a power converter that may be used to couple optical energy from an optical fiber into a sensor on a sensor module.

FIG. 4 illustrates an example power converter circuit 400 that may be used as the power converter 200. A photodetector 402 receives an optical clock signal and converts that signal to electrical energy that is stored in an electrical storage device 404, in parallel with the detector 402. An output from the detector 402 is also coupled to a first chargeable switch 406 and a second chargeable switch 408. The first chargeable switch 406 is connected to a first output line 410, which may be a clock signal line. The second chargeable switch 408 may be coupled to a second line 412, which may be a synchronization (sync) signal line. Both chargeable switches 406 and 408 are coupled to a switch 414 coupled to ground. In an alternative example, two switches may be used, one for each of the elements 406 and 408, and both switches may be coupled to receive an output from the detector 402, which may be a photo-responsive device, such as a photodiode or solar cell. Example photodetectors include PIN photodiodes and pie-wedge-type photodetectors, such as the PPC-6E available from Photonic Power Systems of Cupertino, Calif. Additional examples are provided herein, for example in connection with FIG. 5.

The chargeable switches 406 and 408 may be separately chargeable, such that when charged the switch 414 can put the charged switches 406 and 408 into a conducting state. If either of the switches 406 and 408 is uncharged, then the switch 414 would not place that switch into a conducting state. The switch 414 has an on state and off state and may be any electrically controllable switch, including a bipolar transistor, integrated gate bipolar transistor, field effect transistor including JFETs or MOSFETs (which may be either enhancement or depletion mode devices), uni-junction or programmable uni-junction transistor, an SCR, Schottky diode, or any combination of these, which may be both discrete or integrated in form, and may or may not be matched in the sense that this term is applied within the field of differential amplifiers.

The electrical energy from the detector 402 is partially stored in the electrical storage device 404 and is partially used to assist in saturating the chargeable switches 406 and 408. The detector 402 may provide an electrical signal during a high cycle of a clocking portion of the optical signal on fiber 106, i.e., when photons are received at the detector 402, at which time the storage device 404 is in a storing state. During the low cycle of a clocking portion of the optical signal, no electrical energy is produced by the detector 402, but instead, the electrical storage device 404 enters a driving state and powers the switch 414 to turn on the chargeable switches 406 and 408. The switch 414 may turn on one or both of these switches 406 and 408, depending upon the desired operation and upon whether the switches 406 and 408 are already charged. For example, during normal clock signal operation, the switch 414 may turn on only the chargeable switch 406, to ensure that a clock signal is communicated on the line 410. This could create an electronic clock signal every optical clock cycle, for example. The switch 414 may turn on the chargeable switch 406 less frequently, for example, to communicate a less-frequent sync signal on the line 412. A determination as to when to turn on either of the switches 406 or 408 may be made by switch 414 or via the information in the optical signal.

Figure 5:
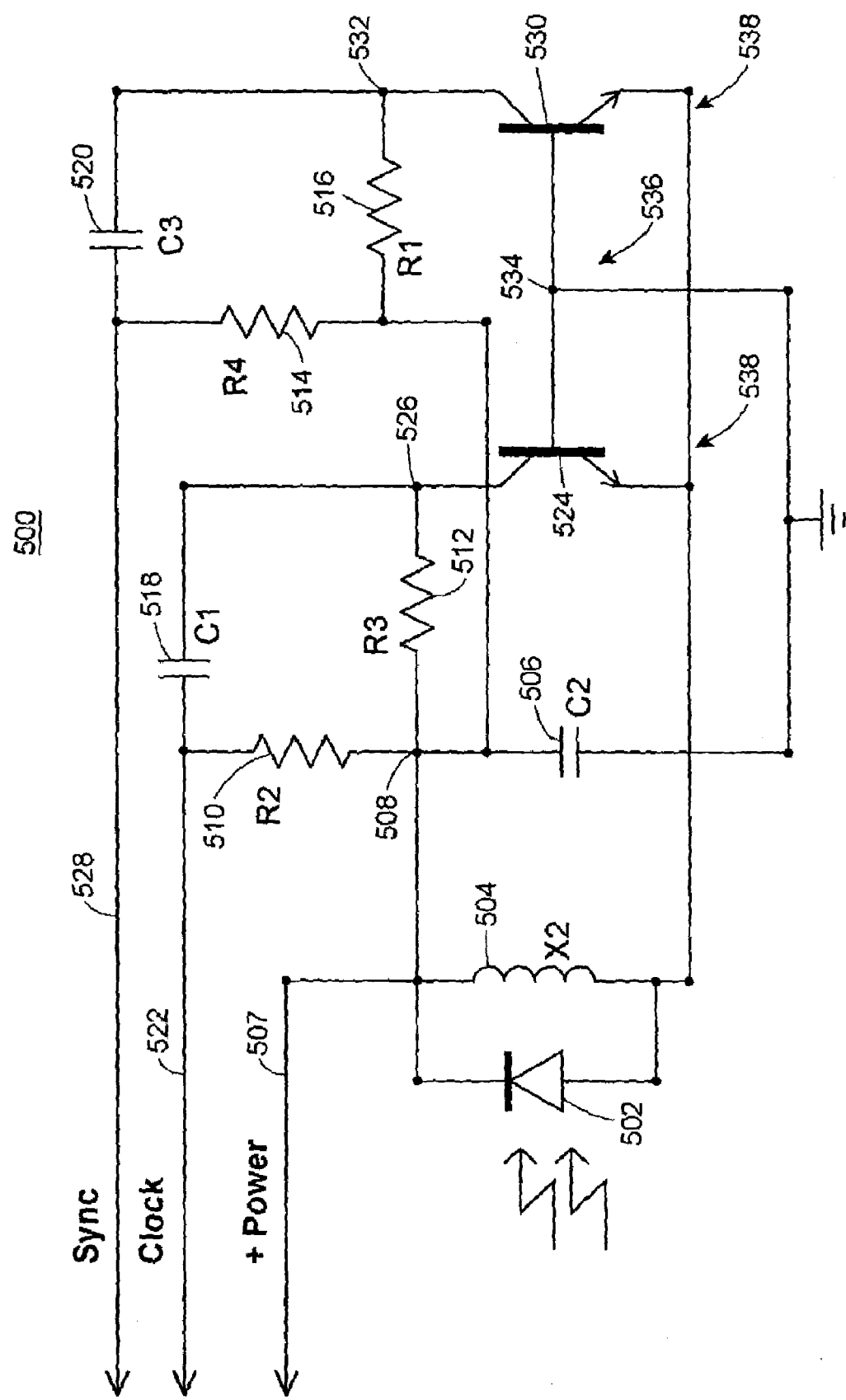
FIG. 5 illustrates a circuit diagram of an example implementation of the power converter of FIG. 4.

FIG. 5 illustrates a detailed circuit 500 that represents an example implementation of the power converter 202. The circuit 500 includes a solar cell 502 (as the detector 402) for receiving an optical clock signal from a coupler connected to a backbone optical fiber, such as the fiber 106. The solar cell 502 is coupled across an inductor (X2) 504 and a capacitor (C2) 506 that form the storage device 404. These elements are coupled to a power output line 507 and a common node 508. The node 508 is also coupled to a first, low resistance resistor (R2) 510 and a first, higher resistance resistor (R3) 512. The node 508 is also coupled to a second, low resistance resistor (R4) 514 and a second, higher resistance resistor (R1) 516. Resistors 510 and 512 are coupled across a capacitor (C1) 518, and resistors 514 and 516 are coupled across a capacitor (C3) 520. Capacitor 518 is coupled to a clock signal output line 522 and to the collector of a transistor 524 at node 526. Capacitor 520 is coupled to a synchronization signal output line 528 and to the collector of a transistor 530 at node 532.

The transistors 524 and 530 are each coupled to ground at their emitters and share a base node 534. In this configuration, the transistors 524 and 530 form a dual transistor switch 536 with a base node 534 coupled to the bypass capacitor 506. The dual transistor switch 536 may be a XN5553 transistor, available from Matsushita Corporation of Japan. The solar cell 502 may have a p-type/insulator/n-type (PIN) layer configuration, as these configurations have lower capacitance translating into a lower power level threshold. Various solar cell devices for optical powering may be used, including pie-wedge solar cells. By way of example, not limitation, solar cells may be formed of a gallium arsenide (GaAs), gallium indium phosphide, aluminum gallium arsenide, indium gallium arsenide, silicon, germanium or a combination of these. Multi-layer solar cell structures formed on a single wafer, such as a GaAs wafer, may be used. Further, the solar cell 502 may or may not have an anti-reflection coating, or other measures to improve efficiency.

In operation, the solar cell 502 forces current to flow through the inductor 504 during the high cycle of the optical signal.

During the low cycle, no current is produced by the solar cell 502, but rather the solar cell 502 is reverse biased, which blocks current flow compared to the direction of current flow during the high cycle. In an example implementation, the optical signal may include an optical clock signal having a 50% duty cycle and a repetition rate from about 1 to 10 kHz, resulting in high and low cycle times of between 0.05 to 0.5 milliseconds.

During the low cycle of the optical signal, the inductor 504 reverse biases the solar cell 502, and voltage across the inductor 504 continues to rise in an inductive kick until the inductor 504 changes from a storing state to a driving state and forces current to flow through the capacitor 506 and into emitter-base junctions 538 of the transistor switch 536. The emitter-base junctions 538 act as a rectifier for the circuit 500. Using a XN5553 circuit as the switch 536, the switch 536 is well matched and is reverse biased on the emitter-base voltage by the bypass capacitor 506. Thus, the dual transistor 536 has relatively low leakage current. The dual transistor may also have a high voltage rating on the reverse emitter-base voltage, in an example, 15 volts.

When base current flows from the inductor 504 into the transistor switch 536, both transistors 524 and 530 turn on, pulling the collectors a bit below ground, because the emitters go below ground by a diode drop, and the transistors 524 and 530 saturate. The saturation pulls nodes 526 and 532 on capacitors 518 and 520 low, respectively. If these capacitors 518 and 520 have had sufficient time to charge, through resistors 512 and 516, then the clock and sync output lines 522 and 528, respectively, will pull low, as well.

The capacitance and resistance values for the circuit 500 may be set such that only the clock line 522 pulls low every clock cycle, however. The RC time constant of the resistors 514, 516 and capacitor 520 may be long enough to prevent a sync pulse from being sent on line 528 simply from the high/low transistors of the optical clock portion of the optical signal. That is, the charging time during the optical clock cycle will not be sufficient to charge this RC constant, with only a few milliseconds of charging from the solar cell 502. Instead, as explained in further detail below, the head end may skip a number of optical clock cycles, within the optical signal, every few seconds. If the skipped number of optical clock cycles is long enough, the capacitor 520 will saturate and a sync signal will be provided on line 528 at the start of the next optical power pulse. By way of example, every 1 to 3 seconds, approximately 15 optical clock cycles in a row may be skipped on the optical signal from the head end, resulting in about 15 milliseconds of no signal. This may leave enough time to charge the capacitor 520 through resistor 516.

Example values for various capacitors and resistors of the circuit 500 are provided in Table 1. These values are by way of example only, as is the structure of the circuit 500. The circuit elements illustrated may be replaced or eliminated. The inductor 504 may be replaced with another storage device, such as a transformer, for example.

TABLE 1

| Element | Example Values |
|---------|---------------|
| X2 | .5 H |
| C1 | 47 pf |
| C2 | 100 μF |
| C3 | 220 pF |
| R1 | 44 MΩ |
| R2 | 39 KΩ |
| R3 | 2.4 MΩ |
| R4 | 39 KΩ |

Figure 6:
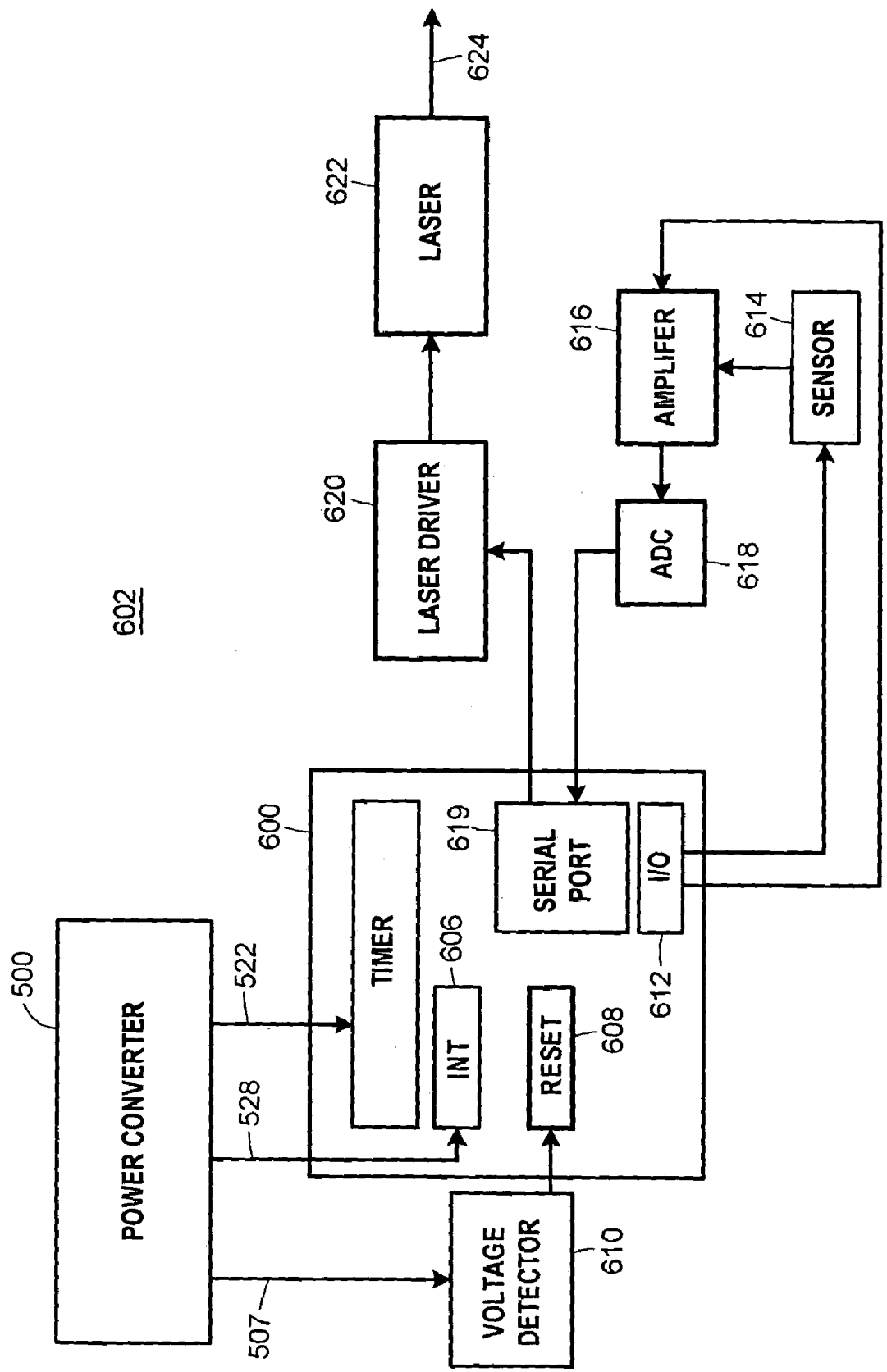
FIG. 6 illustrates a block diagram of an example of a sensor apparatus that may be coupled to the power converter of FIG. 5.

The sync and clock lines 528 and 522 are coupled to a microcontroller 600 of a sensor apparatus 602 (shown in FIG. 6). An example of a microcontroller that may be used as the microcontroller 600 is the PIC microcontroller, available from Microchip Technology of Chandler, Ariz., which is capable of counting a signal (e.g., a clock signal) during a sleep mode. Sleep-mode counting has the advantage of reduced power consumption, as the microcontroller only periodically awakes, for example, after a given counter number has been reached.

As shown, the clock line 522 is coupled from the power converter 500 to a timer circuit 604 within the microcontroller 600. As the capacitor 518 saturates every optical clock cycle, the power converter 500 provides an electrical clock signal to the timer circuit 604 every optical clock cycle, which the timer 604 counts, in an example. The sync line 528 is coupled to an interrupt circuit 606 of the microcontroller 600, which may be used to synchronize the sensor 602 with other sensors on the backbone fiber, so that each sensor module will begin counting clock signals at substantially the same synchronized time. The microcontroller 600 also includes a reset circuit 608 coupled to a voltage detector 610 that receives a power level voltage from power line 507 of the circuit 500. The voltage detector 610, for example, may maintain the microcontroller in an off state until the voltage across capacitor 506 reaches a certain amount. The reset circuit 608 may be used to set the maximum counter value for the timer circuit 604 to adjust the number of electrical clock signals that are counted before the microcontroller awakes.

The power converter 500 and sensor 602 may form part of one sensor module, where a backbone fiber would have a plurality of such sensor modules. Each module would receive the same optical clock signal via the optical signal from the head end. The sync pulses on line 528 for each sensor module serves as the timing starting point that synchronizes all these sensor modules to each other, and to the head end sending the optical clock signal. Each sensor modules' microcontroller 600 is reset by the sync pulses received at the interrupt circuit 606. Each timer circuit 604 then counts the number of clock signals received after that sync pulse, which the microcontroller 600 can do in a sleep mode. Each sensor modules' microcontroller 600 may be programmed, in firmware, to count a different number of clock pulses before waking the microcontroller 600, via a timer overflow interrupt. In this way, the sensor modules are time-division-multiplexed to turn on at different times. The head end may be programmed to identify which sensing module is awake at a particular time based on the number of clock pulses countered therein, based on the order in which the sensor module is awakened in relation to the other sensor modules on the backbone fiber, or based on the number of clock signals provided by the head end. In any event, the head end is able to identify which of the sensor modules on the backbone fiber is transmitting its sensed output signal at a given time.

The microcontroller 600 may be coupled to an input/output stage 612 coupled to a sensor 614 that is positioned to sense a measurable parameter or property in the sensed region around the sensor module. The microcontroller 600 may power any type of sensor desired for sensing, including both optical and non-optical sensors and those of low or even high power, if operated only for short periods. In an example, the microcontroller 600 may be coupled to a tin oxide ($SnO_2$) hydrogen sensor for monitoring hydrogen content in environments on an aircraft. Alternatively, a solid-state hydrogen sensor using palladium films may be used. In any event, the examples are not limited to a particularly type of sensor. The sensor 614 may include a light source and a photodiode, for example. In alternative examples, such as measuring operating conditions on a power line at remote locations, a current or voltage sensor/detector may be used.

In the illustrated example, the signal from the sensor 614 is coupled to an amplifier 616 that may include an optional shutdown pin coupled to input/output interface 612 of the microcontroller 600 to save power. The signal is then coupled to an analog-to-digital converter (ADC) 618 and back into the microcontroller 600, at serial port or bus 619, which then processes the signal and uses it to control and power a laser driver 620 for driving a laser 622. The laser driver 620, for example, may be a modulator and the laser 622 a VCSEL. An output 624 (e.g., a sensed output signal) of the laser 622 is coupled to the backbone fiber via a coupler, such as the coupler 110 or other couples described above with reference to FIGS. 1, 2A and 2B.

In the illustrated configuration, power for the devices may be turned off except for the voltage detector. For example, by using an operation at amplifier with a shut down pin, as the amp 616, the microcontroller 600 may turn off the amp 616 when it is not needed. In fact, the sensor 614, ADC 618, laser device 620, and laser 622 may be turned off when the microcontroller 600 is asleep, leaving only the voltage detector 610 on. This ability to operate in sleep mode may substantially reduce power consumption. Additionally, operating the ADC 618 and laser driver 620 on the same serial port or bus 619 provides power advantage, as the microcontroller 600 uses less clock cycles and as the elements 619 and 620 may be kept off longer.

The sensor 602 is shown by way of example. The sensor 602 may include additional or fewer elements. The sensor 602 may include additional sensors as well, such as voltage or temperature sensors that can be used to monitor and communicate sensor performance data to the head end.

Figure 7:
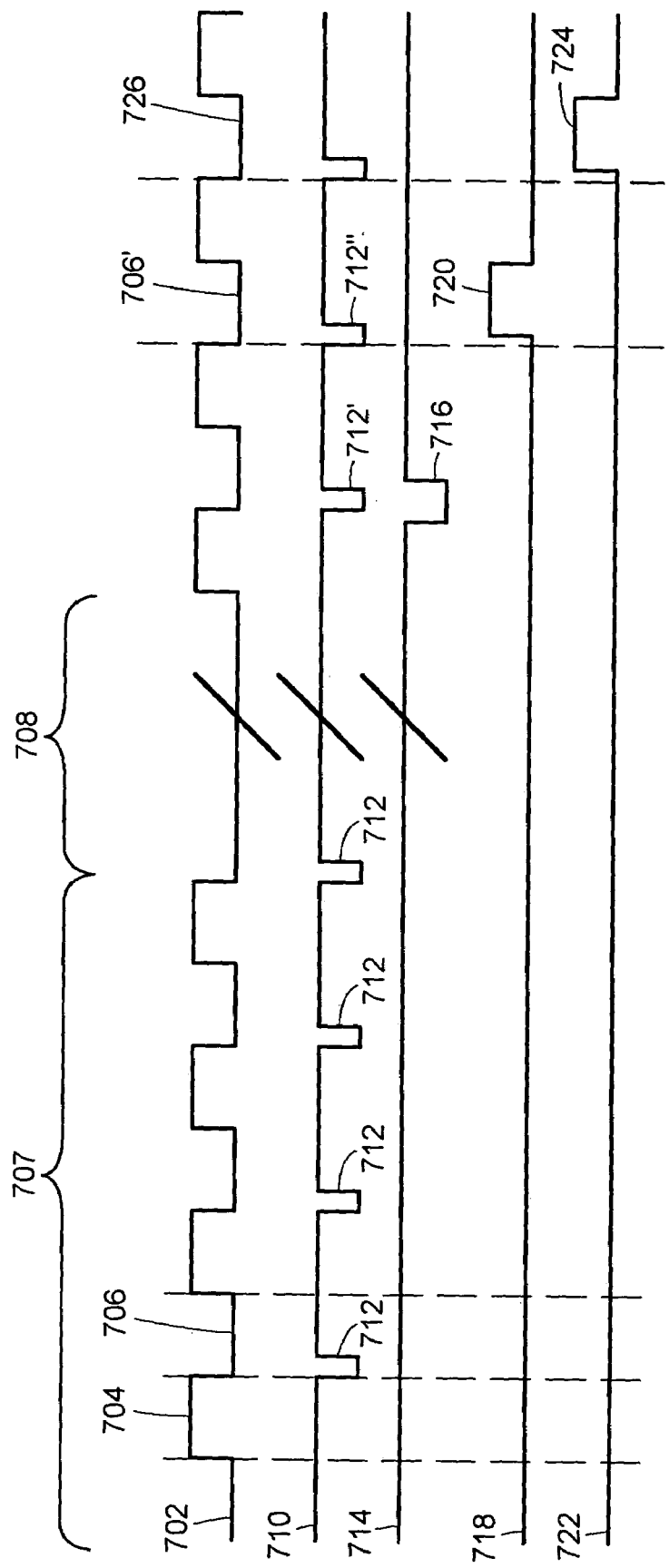
FIG. 7 illustrates a timing diagram of clock, synchronization, and output signals for an example of an optically powered sensor system.

To illustrate an example operation of the power converter and the sensor 602, FIG. 7 illustrates an example optical signal 702 that may be sent from the head end 106. The clock signal 702 includes a clocking portion 707, where the clock cycles occur, and a synchronization (dropout) portion 708 where a number of clock cycles have been skipped by the head end 106, and the optical signal 702 is in a continuous low state. The clock signal portion 707 has a 50% duty cycle comprising a high cycle state 704 and a low cycle state 706 on every clock cycle.

Line 710 represents the electrical clock signal line 522 from the power converter 200 to the sensor 602. The clock signal 710 is maintained high through the first high cycle 704. However, after the high cycle 704, the power converter 500 is triggered to supply a negative clock signal 712 to the sensor 602. The sensor 602 may count the received clock signals 712 via the timer circuit 604. The sensor 602 may be separately programmed to output a sensed signal after a determined number of these clock signals 712 have been counted. Line 714 illustrates the sync output line 528 for the power converter 500.

The power converter 500 has an output to provide a sync signal to the microcontroller 600. By way of example, not limitation, a sync signal 716 is sent from the power converter 500 to the microcontroller 600 following the end of the first clock cycle after the dropout in the clocking 708. In the illustrated example, the sync pulse 716 occurs just after the dropout in the clocking portion 708 has ended in accordance with activation of the switch 414 or 530 due to the inductive kick element of 504. Each sensor module on the backbone fiber would receive this sync pulse 716 simultaneously, which may be used to synchronize each of the sensor modules.

A first output signal from a first sensor module is illustrated at line 718 and includes sensed data 720. The sensor module producing the output signal 718 has been programmed to provide its sensed data 720 after counting a single clock pulse 712', after the sync signal 716. The sensed data 720 is only sent during a low cycle 706' of the clock signal 702 to avoid interference with the high cycle 704, as both clock signal and sensed signals are sent on the same optical fiber 106. Alternatively the sensed data 720 may be sent during a high cycle when, for example, the sensor laser source operates at a different wavelength than that of the signal from the head end. A second sensor module may count a different number of clock signals after the sync signal 716 and produce an output 722. In this example, the sensor module has been programmed to count two clock pulses (712' and 712") after the sync data 716, before for uplinking its sensed data 724 during another low cycle 726.

Figure 8:
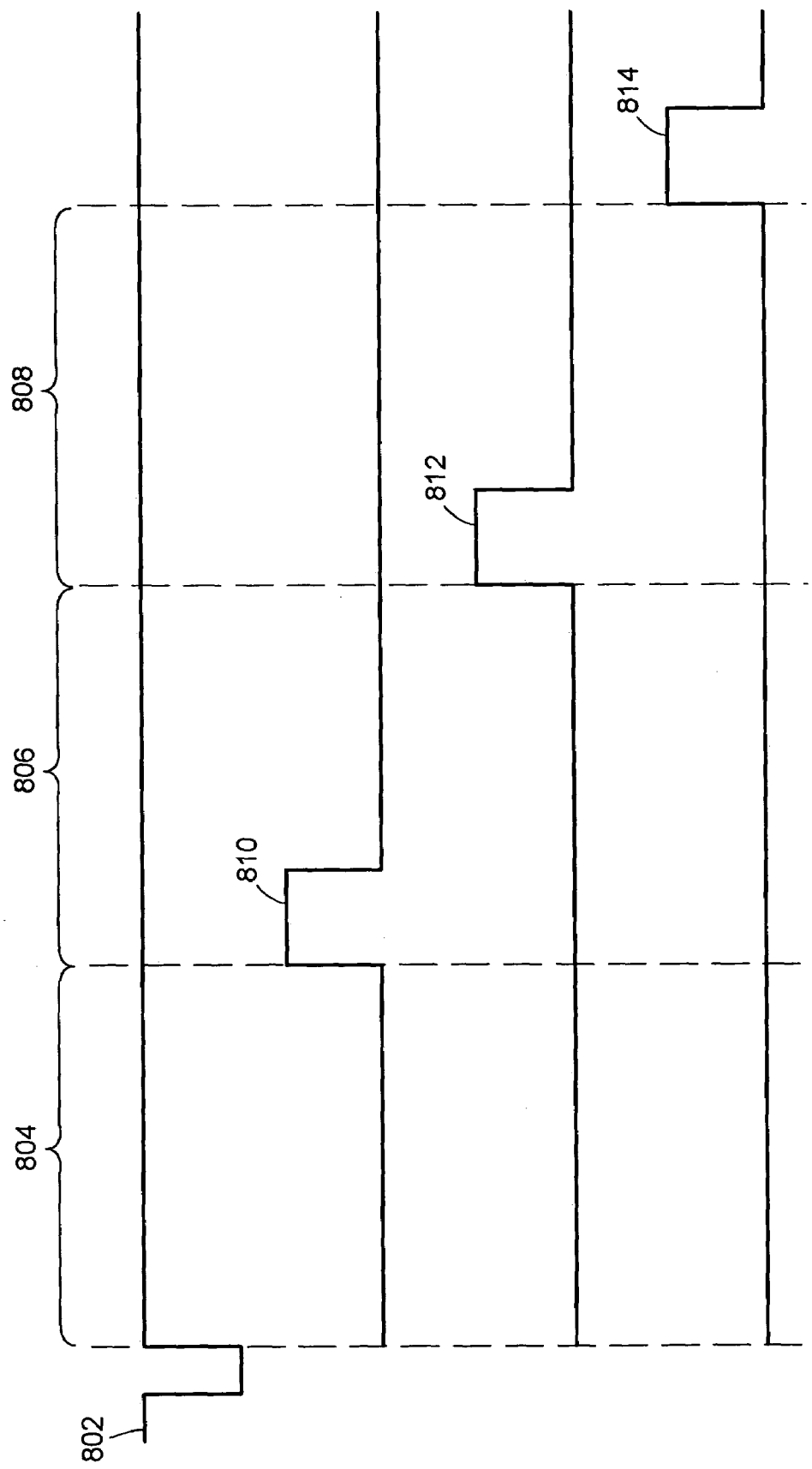
FIG. 8 illustrates a timing diagram of synchronization and output signals for another example of an optically powered sensor system.

The illustrated output 718 and 722 represent signals produced by the laser 622 and are by way of example. The temporal separation between sensed output signals from different sensor modules may be better resolved in a time division multiplexed configuration if each sensor module is programmed to provide an output after numerous clock signals. By way of example, FIG. 8 illustrates a sync line 802 with three identical clocking portions 804, 806, and 808, each representing 50 clock cycles. After the first temporal region 804, a first remote sensor produces an output signal 810. After the second temporal distance 806, a second remote sensor produces an output 812. After the third temporal region 808, a third remote sensor produces the output 814.

Numerous alternatives exist. Techniques and apparatuses for providing an optical system of time division multiplexed remotely located sensor modules are described. And, while it is contemplated that each of the sensor modules could transmit a signal to a head end after a different number of electrical clock signals have been counted, alternatively one or more of the distributed sensor modules may communicate a sensed signal at the same time. The head end may be able to resolve such signals based on differences in frequency, amplitude, or phase, for example. Furthermore, although in some examples it is useful to provide a sensed signal during a low state of the optical signal from the head end, some or all of the sensed signals may be transmitted during a high state. In further alternatives, data other than sensed data may be provided by the remote sensor module. The sensor modules, in particular their microcontrollers, may be programmed to provide operational data on the sensor module, for example, data indicating whether the sensor module is operating or the present voltage level out of the power converter.

The sensed output signal includes data representing a measured parameter, such as temperature. The data may be conveyed by the strength of the sensed signal sent, or via frequency modulation, phase modulation, binary 1's and 0's, or other information imparting techniques. The output signal from the sensor module could instead represent an actual counter value stored in a timer. This counter value could be used by the head end to determine if any of the remote sensor modules lag behind others. In such examples, the head end may send a reset or other instructional data signal to the remote sensor modules. Or at least the head end may identify to a user which sensor modules may be malfunctioning. In any of these examples, multiple data types may be uplinked to the head end during a sync portion.

Numerous applications may be achieved with systems in which a head end is capable of optically powering remote sensors on a fiber, where those remote sensors are able to communicate a sensed signal or other parameter back to the head end on that fiber. For example, a head end can operate at higher power levels, but then reduce output power upon sensing a break in the fiber. The head end may detect where one or more of the nodes are unresponsive. The head end may then either turn off the optical power signal, or reduce the optical power down to a lower, safer level. Additionally, the head end may cause the sensor modules to run at lower duty cycles, using less power, by running longer intervals between synchronization pulses.

It is also possible to send commands from the head end to the sensor modules by, for example, altering the number of clock cycles between dropouts, as a means of encoding transmitted data/commands. It is possible to do such encoding, without interfering with the ability to alter the number of clock cycles between dropouts for optimization of power usage within the sensor modules.

Diagnostic systems may now be implemented with reduced requirements for manual inspections and reduced system downtime. In a vehicle health management system, for example, an optical sensor system may deploy multiple distributed sensors that provide in-flight diagnostic data. In such applications, a diagnostic system may monitor flight or vehicle conditions and generate a responsive maintenance program or protocol in response thereto. The diagnostic system, for example, may have a head end that collects the sensor data from various locations in a vehicle and commutes that data to a management system for algorithm-based or other decision making. The management system may be internal or external to the vehicle, and communication may be wired or wireless, e.g., via a satellite link between a spacecraft, orbital satellite and an earth-based management system with transceiver. The management system may be a computer system, such as personal computer or computer network capable of executing code or algorithms associated with diagnostic assessments of the sensed information.

Figure 9:
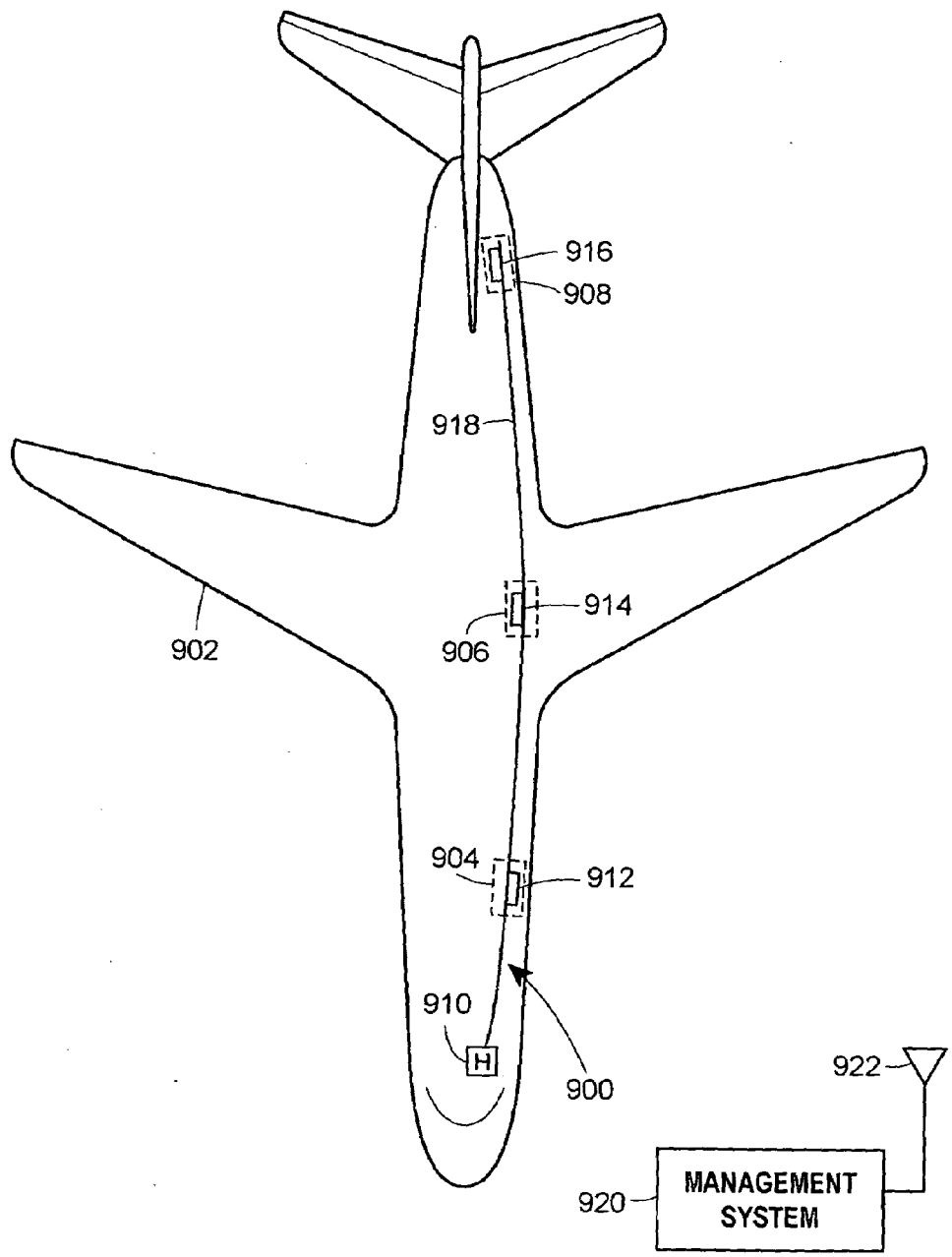
FIG. 9 illustrates an example aircraft environment with an optical sensor system having a head end and a plurality of distributed sensor modules.

By way of example, not limitation, FIG. 9 illustrates an optical sensor system 900 used in an aircraft 902 that has a plurality of locations 904, 906, 908 to be sensed. The locations 904, 906, 908 may represent areas within the aircraft monitored for environmental conditions or other performance metrics, including flight critical data. In the illustrated example, the system 900 includes a head end 910 coupled to three sensors 912, 914 and 916 via an optical fiber 918 for optical powering and data communication. The head end 910 may perform data acquisition, receiving photonic signals from the sensors 912,914 and 916 and processes the received signals. The head 910 may perform full diagnostic analysis on the signals received from the remote sensors 912, 914 and 916 or may communicate signals to a management system 920, such as a computer or computer network. In the illustrated example, the management system 920 is external to the aircraft 902 and in communication with the aircraft communications system or head end directly via a transceiver 922. By way of example, not limitation, the management system 920 may execute coded algorithms to perform data analysis such as filtering, data comparison, data compression/decrompression, Fourier transforms, power spectral density calculations, and diagnosis of sensed structural component fatigue, usage, overload conditions, and/or environment exposures, depending on the sensors deployed. In some examples, the management system 920 may perform or be part of a predictive system that executes prognostic algorithms based on diagnostic data. Such algorithms may be useful in predicting crack growth, strain life, corrosion damage, or other residual strength and life metrics based on diagnostic data and vehicle data (e.g., payload, usage, and environmental exposure). Example systems are described in U.S. Pat. No. 6,691,007, entitled "Vehical Condition Monitoring System," which is expressly incorporated herein by reference.

Although certain apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. An optically-powered sensor apparatus comprising: an optical fiber; a head end coupled to the optical fiber to provide optical clock signals on the optical fiber; and at least two sensor modules coupled to the optical fiber and optically powered by the optical clock signals, each sensor module comprising an optical power converter for converting the optical clock signals to electrical clock signals, a timer for counting the electrical clock signals, and a sensor for sensing a measurable parameter, wherein the at least two sensor modules are adapted to sense the measurable parameter after a different number of electrical clock signals have been counted, and each sensor module senses a different measurable parameter.

2. The optically-powered sensor of claim 1, wherein each sensor module further comprises a laser source coupled to the optical fiber to provide a sensed output signal from the sensor module to the head end, wherein the at least two sensor modules are adapted to send sensed output signals to the head end after a different number of the electrical clock signals have been counted.

3. The optically-powered sensor apparatus of claim 1, wherein each optical power converter comprises a photodetector for receiving the optical clock signals from the optical fiber.

4. The optically-powered sensor apparatus of claim 3, wherein the photodetector is a solar cell having pie-wedge configuration.

5. The optically-powered sensor apparatus of claim 1, wherein each optical power converter comprises: a first chargeable switch for producing the electrical clock signals; a second chargeable switch for producing an electrical synchronization signal; and a transistor switch coupled to selectively switch the first chargeable switch and the second chargeable switch, wherein the second chargeable switch has a different charging time than the first chargeable switch.

6. The optically-powered sensor apparatus of claim 5, wherein the first chargeable switch comprises a first capacitor, the second chargeable switch comprises a second capacitor, and the transistor switch is a dual transistor switch having a common base.

7. The optically-powered sensor apparatus of claim 5, wherein each sensor module comprises a microcontroller operable in a sleep mode and an awake mode, the microcontroller having a timer circuit for counting the electrical clock signals during a sleep mode and an interrupt circuit for switching the microcontroller from a sleep mode to an awake mode.

8. A method of time division multiplexing a plurality of sensor modules coupled to an optical fiber, the method comprising: transmitting an optical signal on the optical fiber, the optical signal having a clocking portion wherein optical clock signals are provided and a synchronizing portion; at each of the plurality of sensor modules, receiving the optical signal by coupling a solar cell to the optical fiber and converting the optical clock signals of the clocking portion to electrical clock signals; synchronizing each of the plurality of sensor modules; counting the electrical clock signals; and for at least two of the plurality of sensor modules, sensing a measurable parameter after a different number of electrical clock signals have been counted.

9. The method of claim 8, further comprising counting electrical clock signals after synchronization.

10. The method of claim 8, further comprising synchronizing each of the plurality of sensor modules after the synchronizing portion.

11. The method of claim 8, further comprising: in response to sensing the measurable parameter, producing an output optical signal at each of the plurality of sensor modules.

12. The method of claim 11, further comprising propagating the output optical signal on the optical fiber to a detector.

13. The method of claim 11, wherein producing the output optical signal comprises driving a laser in response to the sensing of the measurable parameter.

14. The method of claim 8, wherein synchronizing each of the plurality of sensor modules comprises generating a substantially identical synchronization signal at each of the plurality of sensor modules after the synchronization portion of the optical signal.

15. The method of claim 8, further comprising removing cladding from the optical fiber to form a notch having a slanted surface to couple energy from the optical fiber onto the solar cell.

16. The method of claim 15, further comprising bonding the optical fiber to a support opposite the notch.

17. The method of claim 8, further comprising coupling the solar cell to an inductor that stores an electrical signal during a storing state and that supplies the electrical signal during a driving state; and coupling the solar cell to a first chargeable switch and a second chargeable switch, wherein the first chargeable switch has a longer charge time than the second chargeable switch.

18. The method of claim 8, further comprising: providing a timing circuit having a sleep mode and an awake mode, wherein the timing circuit counts the electrical clock signals during a sleep mode and activates a sensor during the awake mode.

19. The method of claim 8, wherein each of the plurality of sensor modules senses the measurable parameter after a different number of electrical clock signals have been counted from each other of the plurality of sensor modules.

20. The method of claim 19, wherein each of the plurality of sensor modules produces an output signal after a different number of electrical clock signals have been counted.

21. An optically-powered sensor apparatus comprising: an optical fiber; a laser source coupled to the optical fiber for providing optical clock signals on the optical fiber; a first sensor module coupled to the optical fiber and optically powered by the laser source, the first sensor module having a sleep mode during which the first sensor module is incapable of sensing a first measurable parameter and an awake mode during which the first sensor module is capable of sensing the first measurable parameter, wherein the first sensor module is adapted to switch from the sleep mode to the awake mode after a first number of optical clock signals have been received at the first sensor module; and a second sensor module coupled to the optical fiber and optically powered by the laser source, the second sensor module having a sleep mode during which the second sensor module is incapable of sensing the second measurable parameter and an awake mode during which the second sensor module is capable of sensing the second measurable parameter, wherein the second sensor module is adapted to switch from the sleep mode to the awake mode after a second number of optical clock signals have been received at the second sensor module, where the second number of optical clock signals is different than the first number of optical clock signals.

22. The optically-powered sensor apparatus of claim 21, wherein each of the first sensor module and the second sensor module comprises an optical power converter for converting the optical clock signals to electrical clock signals, a timer for counting the electrical clock signals, and a sensor for sensing a measurable parameter in response to the timer.

23. A method of diagnosing the state of a vehicle, the method comprising: coupling optical clock signals to the plurality of sensor modules via an optical fiber, each sensor module being disposed at a region of interest and each sensor module having a sleep mode and an awake mode; optically powering the plurality of sensor modules; at each sensor module, counting the number of optical clock signals received during the sleep mode; at each sensor module, in response to the counting of the number of optical clock signals received during the sleep mode, switching the sensor module from the sleep mode to the awake mode, where each sensor module is switched from the sleep mode to the awake mode after a different number of optical clock signals have been counted; at each sensor module, sensing a measurable parameter and producing sensed data; and diagnosing the sensed data from each sensor module.

24. The method of claim 23, further comprising coupling the optical fiber to a head end having a receiver and a microprocessor for diagnosing the sensed data from each sensor module.

25. The method of claim 23, further comprising communicating the sensed data to a diagnosing system via a wireless link.

26. An optically-powered sensor apparatus comprising: an optical fiber; a head end coupled to the optical fiber to provide optical clock signals on the optical fiber; and at least two sensor modules coupled to the optical fiber and optically powered by the optical clock signals, each sensor module comprising an optical power converter for converting the optical clock signals to electrical clock signals, wherein each optical power converter comprises a photodetector, comprising a solar cell having pie-wedge configuration, for receiving the optical clock signals from the optical fiber, a timer for counting the electrical clock signals, and a sensor for sensing a measurable parameter, wherein the at least two sensor modules are adapted to sense the measurable parameter after a different number of electrical clock signals have been counted.

27. An optically-powered sensor apparatus comprising: an optical fiber; a head end coupled to the optical fiber to provide optical clock signals on the optical fiber; and at least two sensor modules coupled to the optical fiber and optically powered by the optical clock signals, each sensor module comprising an optical power converter for converting the optical clock signals to electrical clock signals, a timer for counting the electrical clock signals, and a sensor for sensing a measurable parameter, wherein the at least two sensor modules are adapted to sense the measurable parameter after a different number of electrical clock signals have been counted, wherein each optical power converter comprises: a first chargeable switch for producing the electrical clock signals; a second chargeable switch for producing an electrical synchronization signal; and a transistor switch coupled to selectively switch the first chargeable switch and the second chargeable switch, wherein the second chargeable switch has a different charging time than the first chargeable switch.

28. A method of time division multiplexing a plurality of sensor modules coupled to an optical fiber, the method comprising: transmitting an optical signal on the optical fiber, the optical signal having a clocking portion wherein optical clock signals are provided and a synchronizing portion; at each of the plurality of sensor modules, receiving the optical signal and converting the optical clock signals of the clocking portion to electrical clock signals; synchronizing each of the plurality of sensor modules; providing a timing circuit having a sleep mode and an awake mode, wherein the timing circuit counts the electrical clock signals during a sleep mode and activates a sensor during the awake mode; and for at least two of the plurality of sensor modules, sensing a measurable parameter after a different number of electrical clock signals have been counted.

* * * * *